J. R. JOHNSON.
MILLING MACHINE.
APPLICATION FILED SEPT. 9, 1913.
1,139,422.
Patented May 11, 1915.
2 SHEETS—SHEET 1.
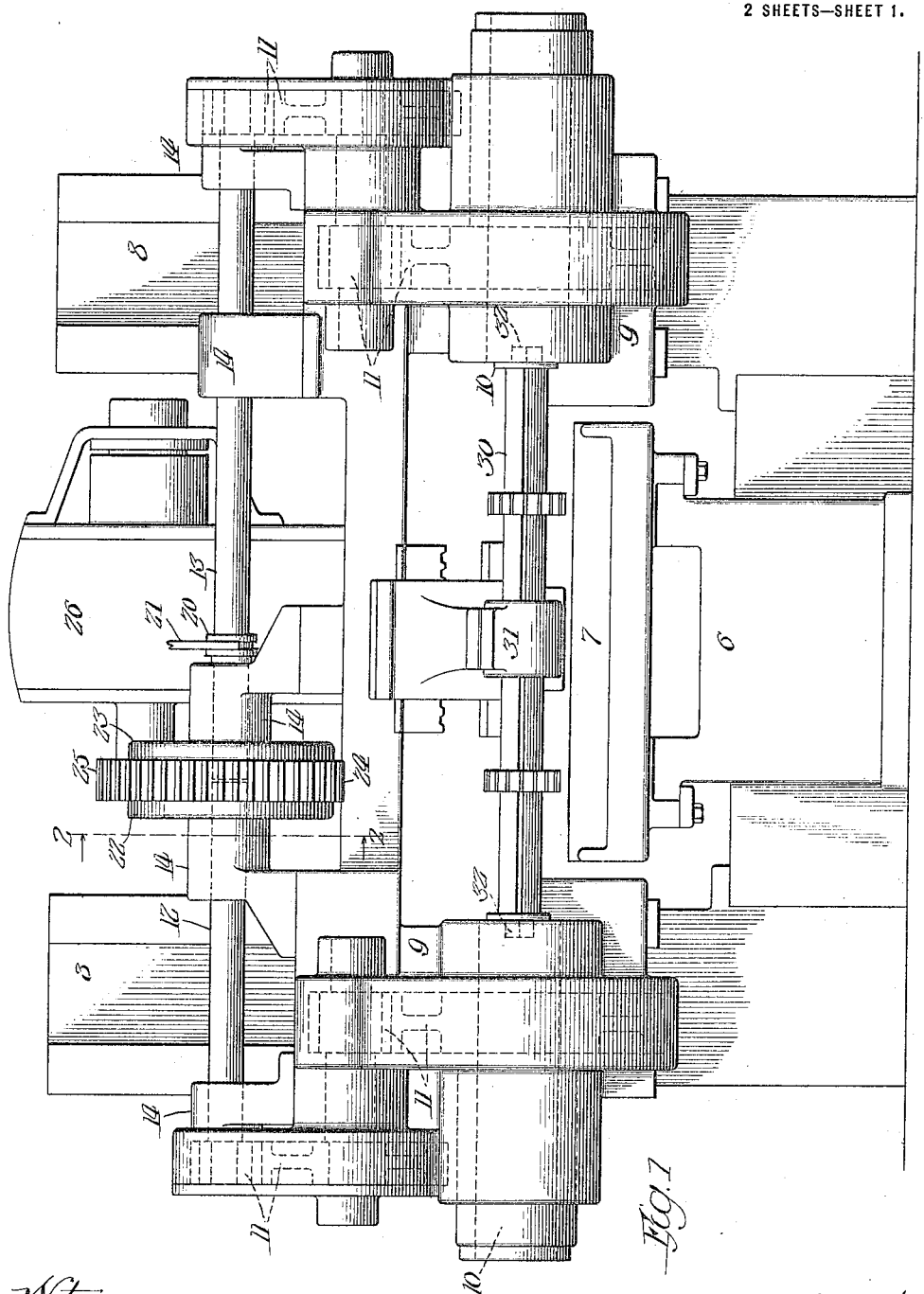

J. R. JOHNSON.
MILLING MACHINE.
APPLICATION FILED SEPT. 9, 1913.
1,139,422.
Patented May 11, 1915.
2 SHEETS—SHEET 2.
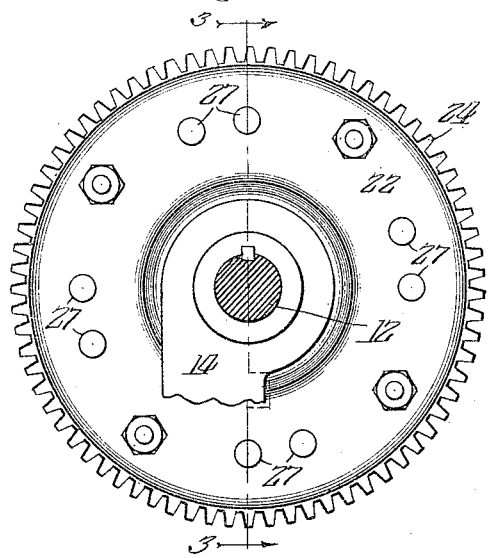
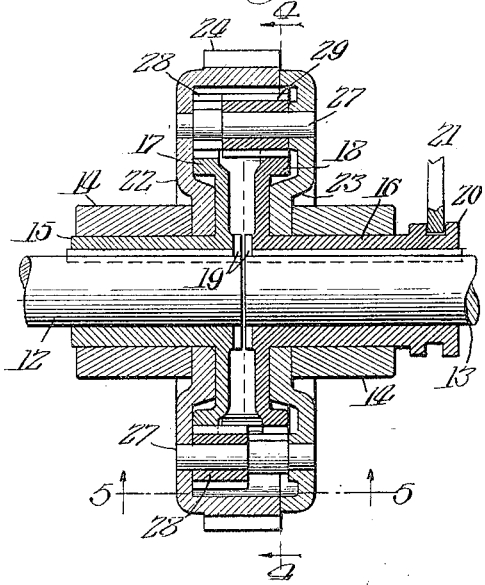
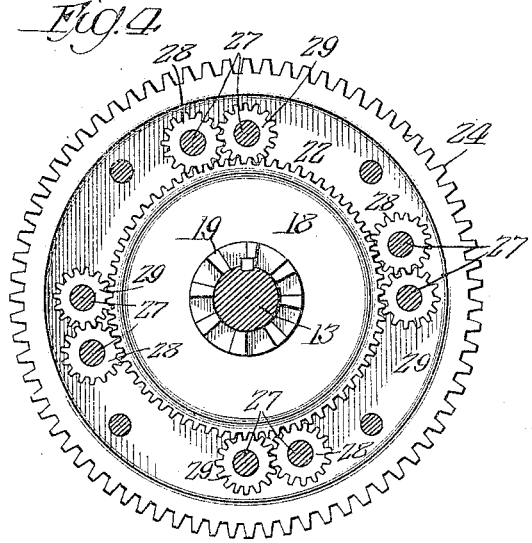
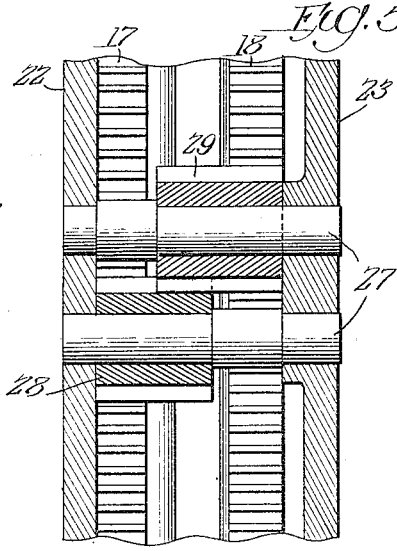
Witnesses:
Harold E. Barrett.
John F. McCanna Jr.
Inventor
John R. Johnson
by A. O. Behel.
Atty.

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING-MACHINE.

1,139,422.  Specification of Letters Patent.  Patented May 11, 1915.

Application filed September 9, 1913.  Serial No. 788,800.

*To all whom it may concern:*

Be it known that I, JOHN R. JOHNSON, a citizen of the United States, residing at Rockford, in the county of Winnebago and State of Illinois, have invented certain new and useful Improvements in Milling-Machines, of which the following is a specification.

This invention relates to milling machines of the planing type, and has more particular reference to machines which embody a cutting bar or arbor which is driven from both of its ends.

In machines of this character it is customary to drive both ends of the cutter-bar or arbor from a common source of drive and to transmit the drive through separate trains of gearing at each end of the cutter-bar. Obviously, with a direct line of drive from a common source of power to each end of the cutter-bar and with a pair of cutters mounted spaced apart on the cutter-bar, when one cutter is idle by reason of a gap in the work operated upon, or for any other reason, the cutter in cutting operation will receive all the power and the cutter-bar intermediate its driven end and the operating cutter will be subjected to considerable torsion.

My invention aims, primarily, to provide in apparatus of the character described, means for driving a cutter-bar whereby the same will be driven equally at both ends and the torsion will be proportioned equally throughout the cutter-bar under varying conditions of the cutter.

It is desirable to connect each end of the cutter-bar with the driven member of each train of gears through a square or angular socket and shank connection, the ends of the cutter-bar being shaped and received into the sockets of the driven members. Since each of said driven members is connected with the last gear of a train of gears which is driven from a common source of drive, it is obvious that it is very difficult to properly aline the square socket of each driven member so as to receive the square ends of the cutter-bar when mounting the same, this difficulty arising, primarily, from variations in the play in the gear teeth. It is evident that with a fixed line of drive from a common source of power to both ends of the cutter-bar and with the socket not properly alined, one end of the cutter-bar would receive very little, if any, driving power. These defects I aim to remedy by my invention, so that one of the driven members may be moved relatively to the other to properly aline its socket with that of the other, and so that both ends of the cutter-bar will be driven equally, regardless of the variations in the mesh of the gears.

With the above considerations in view, I provide in the drive to both ends of the cutter, a sectional shaft driven by differential gearing, each section of the shaft having a driving connection with one end of the cutter-bar. By this means the drive transmitted to each end of the cutter-bar will be varied automatically according to the resistance at each end of the cutter-bar, and a uniform drive will be had wherein the torsion of the cutter-bar will be equalized under varying conditions of cutting. The driven members may also be moved rotatably with respect to each other to aline the sockets when the cutter-bar is being mounted, and differences in the mesh of the gear trains will be automatically compensated for.

Another object of my invention is to provide in the above described mechanism, clutch means for locking two members of the sectional shaft or driven members of the differential fixedly together whereby both of said driven members may be fixed relatively and driven through a common source of drive, and also whereby either driven member may be driven separately when the cutter-bar is not used.

Referring to the drawings: Figure 1 is a face elevation of a milling machine of the planer type embodying my invention. Figs. 2, 3, and 4 are sectional views taken on the lines 2—2, 3—3, and 4—4 of Figs. 1, 2, and 3 respectively, illustrating the differential drive means; and Fig. 5 is an enlarged detail sectional view taken on the line 5—5 of Fig. 3.

In Fig. 1 I have illustrated briefly a milling mechanism of the planer type which comprises a bed 6, a table 7 slidably mounted thereon, side housings 8, and a cross-head 9 slidably mounted upon vertical ways on the side housings for carrying a cutter-bar and driving means therefor.

Upon each side portion of the cross-head is mounted so as to move rotatably and axially a cutter spindle 10 and a train of step-down gears 11 for rotating the spindle, the said spindles being coaxial. A sectional shaft comprising shaft connections 12 and 13 is journaled above the said spindle in bearing 14, and each shaft section has a driving connection with one of the trains of gearing.

A differential gear driving mechanism is mounted in connection with the adjoining ends of the shaft connections 12 and 13 and may be of any suitable construction, a suitable construction being illustrated in the drawings, and constructed as follows: Sleeves 15 and 16 are splined upon the inner ends of shaft connections 12 and 13 respectively, and have formed respectively, at their inner ends spur gears 17 and 18. The inner ends of said sleeves are also provided with serrated faces 19; and sleeve 16 is provided with an annularly grooved head 20 with which groove a yoked member 21 coöperates and may be operated in any suitable manner to move the said sleeve 16 axially to engage and disengage the serrated faces 19. Circular casings 22 and 23 are mounted loosely upon the sleeves 15 and 16 respectively, forming a gear and an inclosed circular housing, the casing 22 being provided on its periphery with a spur gear 24. A pinion spur gear 25 meshes with said spur gear 24 and may be driven by a motor 26 or any suitable driving means. A plurality of pairs of cross-shafts 27 are mounted in the casings 22 and 23, and each pair has a spur pinion gear 28 mounted upon one shaft in mesh with the spur gear 17, and a spur pinion gear 29 on the other shaft in mesh with the spur gear 18, the said pinion gears 28 and 29 being in mesh intermediate said gears 17 and 18.

A cutter-bar or arbor designated by the reference character 30 is journaled intermediate its ends in a bearing 31 mounted upon the cross head 9 and has its ends formed square as at 32, and received into square sockets in the spindle members 10, whereby the cutter-bar may be driven by the driving means above described. Cutting tools may be mounted upon the cutter-bar in any order desirable, there being illustrated in Fig. 1 a pair of cutters arranged so that each cutter may operate upon work carried at each side portion of the table 7.

In the operation of the machine, assuming that both cutters on the cutting-bar or arbor are in cutting operation upon work carried by the table and have equal resistances, the shafts 12 and 13 will likewise have equal resistances. Since these shaft sections are the driven members of a differential gear mechanism, said mechanism will be driven as a unitary member; that is, the casings 22 and 23, gears 17 and 18 and gears 28 and 29 will be rotated as one member and without relative rotary movement of any of the gears. Should the work carried by the table 7 be such that one of the cutters is in continuous cutting operation and the other is in intermittent cutting operation, whereby the latter cutter would be at times rotated without resistance, or should the resistances of the two cutters be unequal for any other reason, the unequal resistances of the cutters would be transmitted to the shaft sections 12 and 13. Under these conditions the differential driving mechanism would so transmit power to the two shaft sections as to equalize the driving power between said shaft sections, and thereby equalize the drive applied at both ends of the cutter-bar. Taking for an example, it may be assumed that the cutter at the right in Fig. 1 is working idle or against less resistance than is the other cutter, in which case the tendency would be for the greatest torsion on the cutter-bar to be found intermediate its left driven end and the cutter adjacent thereto, upon which end the blunt of the driving power would be applied. The heavy resistance falling on the left cutter would be transmitted to the gear 17 of the differential. The retardation of this gear 17 would cause such retardation to be transmitted through gears 28 and 29 to accelerate the speed of gear 18, or, in other words, to transmit greater power to gear 18 and to the right end of the cutter-bar because of its lesser resistance. This is a common action of differential mechanism. Thus the driving power from the motor would be automatically equally disposed to both ends of the cutter-bar, and the higher torsion on the cutter-bar intermediate its said left end and the cutter adjacent thereto would be proportioned substantially equally throughout the length of the cutter-bar.

When setting up the machine it is practically impossible to aline the sockets in the spindles 10 so that they will receive the square ends of the cutter-bar and drive the same in the proper manner, because of the unevenness in the mesh of different trains of gears. It is obvious that the relative rotary movement of the spindle 10 to aline the said square sockets may be had through the differential gear mechanism; also, variation in the mesh of the different trains of gears will be compensated for through the differential action of said mechanism, so that (the resistance of the cutters being the same) each end of the cutter-bar will be driven with the same amount of power.

While I have shown and described a preferred embodiment of my invention, I do not desire to limit myself to the specific embodiment shown, since various changes in the structural details may be resorted to within the scope of the appended claims without departing from the spirit of the invention or sacrificing any of its material advantages.

I claim as my invention.

1. In apparatus of the character set forth, the combination of a cutter holding bar, and means for driving said bar at both ends including a differential gearing through which power is transmitted.

2. In apparatus of the character set forth, the combination of a cutter holding bar and a common drive connection including a differential gearing connected with both ends of said cutter holding bar.

3. In a milling machine, the combination of rotatable cutter spindles, cutter holding means connecting the spindles, a driving connection for rotating both spindles, and a differential gearing operably connected to said driving connection and adapted to be driven to drive said driving connection.

4. In a milling machine, the combination of two rotary cutter spindles, means rigidly connecting the spindles, and a differential mechanism for driving said spindles.

5. In apparatus of the character set forth, the combination of a rotatable cutter holding bar, driving means for rotating said bar from both ends thereof, and means for automatically equalizing the torsional resistance of said driving means coming from both of said bar ends.

6. In apparatus of the character set forth, the combination of a rotatable cutter holding bar, a sectional drive shaft, each section having a driving connection with an end of said cutter bar, and means for rotating said shaft sections with an equal force and allowing rotary movement of one section with respect to the other.

7. In a milling machine, the combination of two rotary cutter holding spindles, means rigidly connecting said spindles, a differential gear driving mechanism having each of its two driven members in driving connection with one of said spindles, and means for fixedly connecting said two driven members whereby they will rotate together.

8. In apparatus of the character set forth, the combination of a cutter holding bar, two driving connections each in connection with one end of the said bar, a differential drive connecting said two driving connections, and means for locking said two driving connections fixed rigidly together.

9. In apparatus of the character set forth, the combination of a rotary cutter-holding bar, and driving means for driving said bar at both ends thereof including differential mechanism for driving said ends as to maintain the torsion of the bar equal throughout the length thereof regardless of variations in cutting resistances from cutters at different points on the cutter-holding bar.

10. In a milling machine, the combination of a pair of spaced and coaxially mounted cutter spindles, a two-section shaft mounted parallel with the axes of said spindles, a train of gears connected to each cutter spindle and a shaft of said sectional shaft, and a differential driving mechanism connected to the sections of the sectional shaft for transmitting differential drive to the same.

11. In a milling machine, the combination of a pair of spaced coaxially mounted cutter spindles, cutter holding means interposed between and connected to said spindles, a train of gearing connected to each spindle, and a differential driving mechanism having a driving connection with each train of gearing for transmitting differential drive thereto.

12. In apparatus of the character set forth, the combination of a rotary cutter-holding bar, a two-section drive shaft, each section having a driving connection with an end of the cutter bar, means for driving said shaft sections by a differential driving mechanism, and means for moving one of the shafts axially to engage fixedly with the other shaft.

In testimony whereof I have hereunto set my hand in presence of two subscribing witnesses.

JOHN R. JOHNSON.

Witnesses:
JOHN F. McCANNA, Jr.,
E. D. E. N. BEHEL.

Copies of this patent may be obtained for five cents each, by addressing the "Commissioner of Patents, Washington, D. C."

It is hereby certified that in Letters Patent No. 1,139,422, granted May 11, 1915, upon the application of John R. Johnson, of Rockford, Illinois, for an improvement in "Milling-Machines," errors appear in the printed specification requiring correction as follows: Page 3, line 10, after the word "bar" insert a comma; same page, line 59, after the word "for" insert the word *so;* same page, line 73, after the word "spaced" insert the word *and;* and that the said Letters Patent should be read with these corrections therein that the same may conform to the record of the case in the Patent Office.

Signed and sealed this 1st day of June, A. D., 1915.

[SEAL.]

J. T. NEWTON,
*Acting Commissioner of Patents.*